No. 738,732. PATENTED SEPT. 8, 1903.
A. PATTERSON.
VALVE FOR HYDRAULIC ENGINES OR MACHINERY.
APPLICATION FILED MAR. 30, 1903.
NO MODEL.
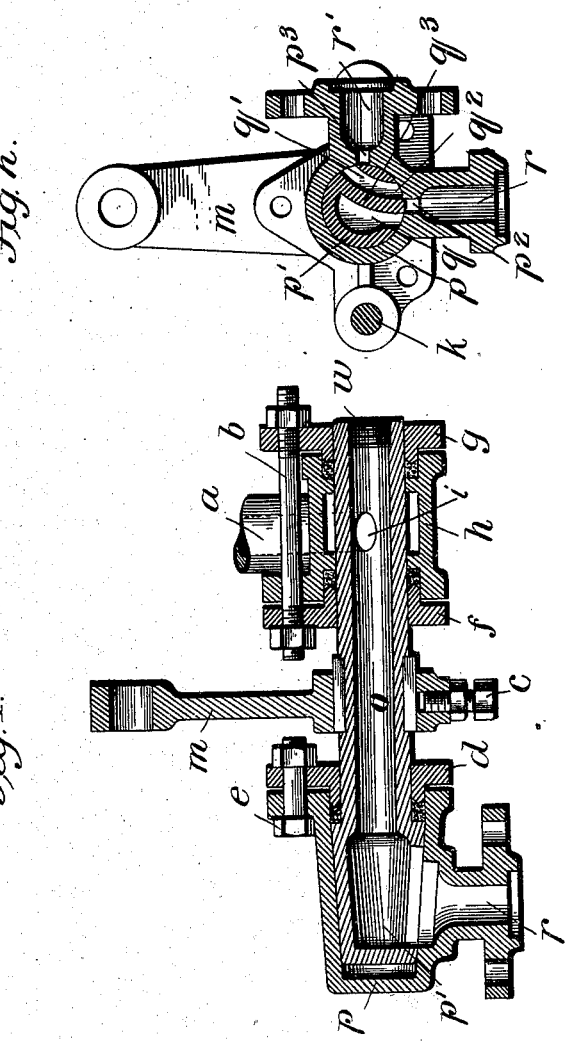

No. 738,732.     Patented September 8, 1903.

UNITED STATES PATENT OFFICE.

ANTHONY PATTERSON, OF CARDIFF, ENGLAND.

VALVE FOR HYDRAULIC ENGINES OR MACHINERY.

SPECIFICATION forming part of Letters Patent No. 738,732, dated September 8, 1903.

Original application filed May 13, 1902, Serial No. 107,175. Divided and this application filed March 30, 1903. Serial No. 150,300. (No model.)

*To all whom it may concern:*

Be it known that I, ANTHONY PATTERSON, a subject of the King of Great Britain, residing at Cardiff, in the county of Glamorgan, Wales, England, have invented certain new and useful Improvements in Valves for Hydraulic Engines and Machinery, (Case D;) and I do hereby declare the following to be a full, clear, and exact description of the invention, such as will enable others skilled in the art to which it appertains to make and use the same.

My invention relates to valves for hydraulic engines and hydraulic machinery. By the improvements in which my invention consists such valves are of increased efficiency, because they are more completely water-tight, they are more thoroughly balanced, and hence the wear and tear in them are reduced and they are actuated with greater ease and expedition and are under more complete control. They are suitable for very high water-pressures. The valves are less liable to shocks and consequent injury to themselves and the engines in connection with which they are fitted and in the operation of which they are employed.

This application is a division of my former application, Serial No. 107,175, filed May 13, 1902.

In the accompanying drawings, Figure 1 represents a longitudinal section of my invention, and Fig. 2 is a cross-section of the same through the center piece of the valve.

The valve which is the subject of the present invention is a working valve—that is to say, a valve which is operated by the engine itself. The working valve shown in the drawings is single-acting—that is to say, it is not used in connection with a reversing-engine. This valve has a long hollow throat $o$, one end of which is closed by the plug $w$ and the other end of which terminates in the conically-shaped center piece $p'$. This center piece $p'$ is provided with a chamber $q$ and a passage terminating in ports $q'$ and $q^2$, separated from each other by a nearly-vertical partition $q^3$. The outer end (shown on the left in Fig. 1) of the center piece $p'$ is closed.

Surrounding the center piece $p'$ is a similarly-shaped casing $p$, having two ports $p^2$ and $p^3$ leading into the branch connections $r$ and $r'$, of which the former is connected to the engine or machine which the valve controls and the latter serves as an exhaust. It should be noted that these supply and exhaust connections are located at right angles to the axis of the valve.

A stuffing-box $d$ is arranged around the throat $o$ near one of its ends to keep the water or other motor fluid from leaking out between the center piece $p'$ and casing $p$, and this stuffing-box is secured to the casing $p$ by bolts $e$.

$m$ represents the shifting-lever so connected with the operating parts of the engine that it automatically shifts the valve from the supply position to the exhaust position at the proper time. This lever is connected to said valve at or near its center. This lever is adjustable back and forth upon the valve to which it is splined. A set-screw $c$ is used to secure the lever in its desired position upon the valve. $a$ represents the inlet-pipe for the motor fluid, which is connected to the valve at right angles to its axis.

Stuffing-boxes $f$ and $g$ are used on either side of the point where the pipe $a$ communicates with the valve, and these stuffing-boxes are secured to the casing $h$ by bolts $b$.

The casing $h$ surrounds the valve at the point where the motor fluid is delivered to said valve through the opening $i$, and pipe $a$ delivers into this casing $h$. Bolts $k$ (shown in section in Fig. 2) hold the parts firmly together. These bolts pass through extensions in the casings $p$ and $h$.

Having thus described my invention, what I claim as new, and desire to secure by Letters Patent of the United States, is—

A single-acting working valve for hydraulic engines, having a long throat and having one end thereof closed by a plug and terminating at the other end in a conically-shaped center piece, provided with a chamber and a passage, in combination with a conically-shaped casing surrounding said center piece, and provided with passages and ports arranged at right angles to the axis of said valve, an operating-lever connected to said valve at or near its center, a supply-pipe at right angles to said valve, and stuffing-boxes, substantially as described.

In testimony whereof I affix my signature in presence of two witnesses.

ANTHONY PATTERSON.

Witnesses:
CLARA EMILY WAKEFORD,
STANLEY RALPH PATTERSON.